US011087781B2

(12) United States Patent
Takagishi et al.

(10) Patent No.: US 11,087,781 B2
(45) Date of Patent: Aug. 10, 2021

(54) MAGNETIC HEAD INCLUDING PLURAL MAGNETIC LAYERS AND PLURAL INTERMEDIATE LAYERS AND MAGNETIC RECORDING DEVICE (71) Applicants: KABUSHIKI KAISHA TOSHIBA, Tokyo (JP); TOSHIBA ELECTRONIC DEVICES & STORAGE CORPORATION, Tokyo (JP)

(72) Inventors: Masayuki Takagishi, Kunitachi Tokyo (JP); Naoyuki Narita, Funabashi Chiba (JP); Tomoyuki Maeda, Kawasaki Kanagawa (JP); Hitoshi Iwasaki, Nerima Tokyo (JP); Hirofumi Suto, Ota Tokyo (JP); Tazumi Nagasawa, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 16/820,917

(22) Filed: Mar. 17, 2020

(65) Prior Publication Data
US 2021/0074320 A1 Mar. 11, 2021

(30) Foreign Application Priority Data

Sep. 6, 2019 (JP) ............................. JP2019-163030

(51) Int. Cl.
*G11B 5/31* (2006.01)
*G11B 5/127* (2006.01)
(Continued)

(52) U.S. Cl.
CPC .............. *G11B 5/1278* (2013.01); *G11B 5/02* (2013.01); *G11B 5/315* (2013.01); *G11B 5/3133* (2013.01); *G11B 5/3146* (2013.01); *G11B 5/66* (2013.01)

(58) Field of Classification Search
None
See application file for complete search history.

(56) References Cited

U.S. PATENT DOCUMENTS 8,879,205 B2* 11/2014 Shiimoto ............... G11B 21/02
                                                     360/125.3
9,064,508 B1*  6/2015 Shiimoto ............... G11B 5/187
(Continued)

FOREIGN PATENT DOCUMENTS

JP    2010-40060 A    2/2010
JP    2019-56607 A    4/2019

OTHER PUBLICATIONS

Zhu, J., "Dual Side Spin Transfer Spin Torque Oscillator for Microwave Assisted Magnetic Recording," Joint MMM-Intermag Conference Abstracts, p. 9, AB-11 (2016).

*Primary Examiner* — Jefferson A Evans
(74) *Attorney, Agent, or Firm* — Finnegan, Henderson, Farabow, Garrett & Dunner L.L.P.

(57) ABSTRACT

According to one embodiment, a magnetic head includes a magnetic pole, a first shield, a first magnetic layer, a second magnetic layer, a third magnetic layer, a first intermediate layer, a second intermediate layer, a third intermediate layer, and a fourth intermediate layer. The first magnetic layer is provided between the magnetic pole and the first shield. The second magnetic layer is provided between the first magnetic layer and the first shield. The third magnetic layer is provided between the second magnetic layer and the first shield. The first intermediate layer is provided between the magnetic pole and the first magnetic layer. The second (Continued)

intermediate layer is provided between the first magnetic layer and the second magnetic layer. The third intermediate layer is provided between the second magnetic layer and the third magnetic layer. The fourth intermediate layer is provided between the third magnetic layer and the first shield.

17 Claims, 9 Drawing Sheets

(51) Int. Cl.
  *G11B 5/66* (2006.01)
  *G11B 5/02* (2006.01)

(56) References Cited

U.S. PATENT DOCUMENTS

| | | | |
|---|---|---|---|
| 9,087,532 B2 | 7/2015 | Shimizu et al. | |
| 9,099,107 B1 * | 8/2015 | Igarashi | A61M 11/042 |
| 9,805,746 B1 * | 10/2017 | Okamura | G11B 5/147 |
| 10,090,007 B2 | 10/2018 | Zhu | |
| 10,839,833 B1 * | 11/2020 | Freitag | G11B 5/314 |
| 10,937,450 B1 * | 3/2021 | Kawasaki | G11B 5/02 |
| 2008/0019040 A1 * | 1/2008 | Zhu | G11B 5/1278 360/110 |
| 2008/0268291 A1 * | 10/2008 | Akiyama | G11B 5/314 428/812 |
| 2010/0027158 A1 | 2/2010 | Takagishi et al. | |
| 2011/0096443 A1 * | 4/2011 | Zhang | G01R 33/098 360/324.2 |
| 2012/0126905 A1 * | 5/2012 | Zhang | G11C 11/1675 331/94.1 |
| 2013/0271866 A1 * | 10/2013 | Sato | G11B 5/3146 360/71 |
| 2014/0036387 A1 * | 2/2014 | Sato | G11B 5/3146 360/78.04 |
| 2014/0377589 A1 * | 12/2014 | Freitag | G11B 5/3143 428/812 |
| 2018/0268848 A1 * | 9/2018 | Narita | G11B 5/3983 |
| 2019/0086377 A1 | 3/2019 | Ikehashi et al. | |
| 2020/0294537 A1 * | 9/2020 | Nagasawa | G11B 5/1278 |

* cited by examiner

MAGNETIC HEAD INCLUDING PLURAL MAGNETIC LAYERS AND PLURAL INTERMEDIATE LAYERS AND MAGNETIC RECORDING DEVICE

CROSS-REFERENCE TO RELATED APPLICATIONS

This application is based upon and claims the benefit of priority from Japanese Patent Application No.2019-163030, filed on Sep. 6, 2019; the entire contents of which are incorporated herein by reference.

FIELD

Embodiments described herein relate generally to a magnetic head and a magnetic recording device.

BACKGROUND

Information is recorded in a magnetic storage medium such as a HDD (Hard Disk Drive) or the like by using a magnetic head. It is desirable to increase the recording density of the magnetic head and the magnetic recording device.

DETAILED DESCRIPTION

According to one embodiment, a magnetic head includes a magnetic pole, a first shield, a first magnetic layer, a second magnetic layer, a third magnetic layer, a first intermediate layer, a second intermediate layer, a third intermediate layer, and a fourth intermediate layer. The first magnetic layer is provided between the magnetic pole and the first shield. The second magnetic layer is provided between the first magnetic layer and the first shield. The third magnetic layer is provided between the second magnetic layer and the first shield. The first intermediate layer is provided between the magnetic pole and the first magnetic layer. The first intermediate layer includes at least one selected from a first group consisting of Au, Cu, Ag, Al, and Ti. The second intermediate layer is provided between the first magnetic layer and the second magnetic layer. The second intermediate layer includes at least one selected from a second group consisting of Ta, Ir, W, Mo, Cr, Tb, Rh, and Pd. The third intermediate layer includes at least one selected from the first group and is provided between the second magnetic layer and the third magnetic layer. The fourth intermediate layer includes at least one selected from the second group and is provided between the third magnetic layer and the first shield.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

FIRST EMBODIMENT

Figure 1:
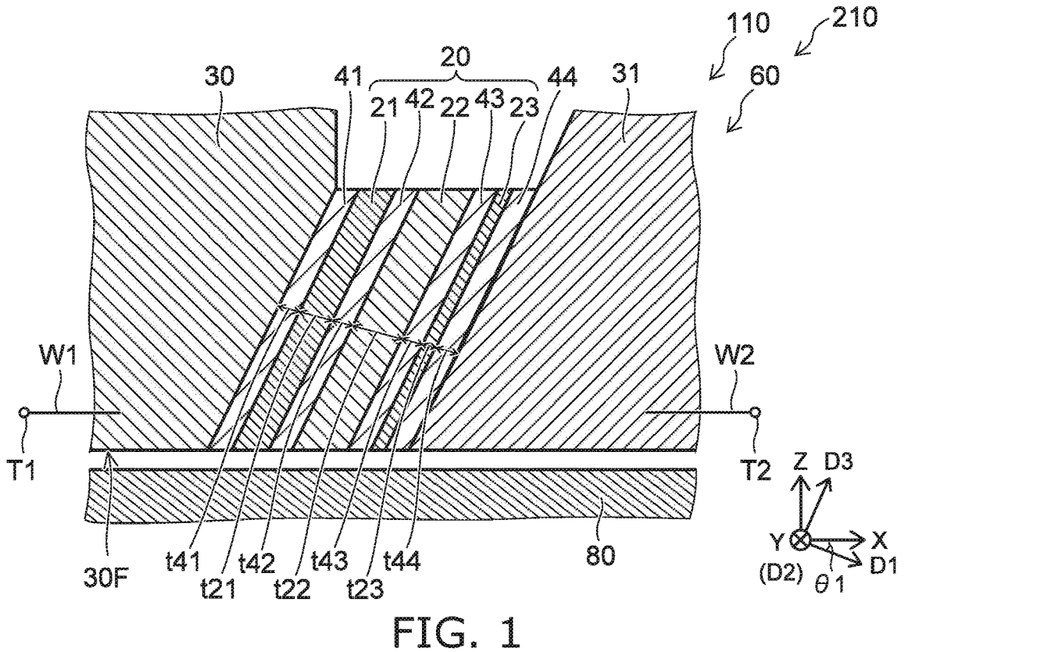
FIG. 1 is a schematic cross-sectional view illustrating a magnetic head according to a first embodiment.

FIG. 1 is a schematic cross-sectional view illustrating a magnetic head according to a first embodiment.

Figure 2:
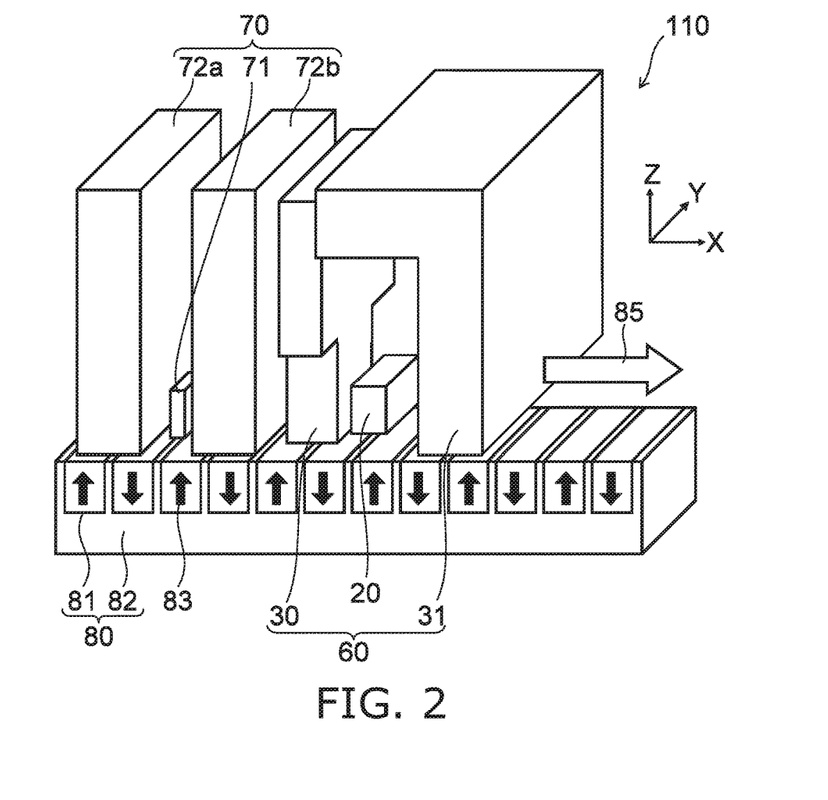
FIG. 2 is a schematic perspective view illustrating a magnetic recording device according to the first embodiment.

FIG. 2 is a schematic perspective view illustrating the magnetic recording device according to the first embodiment.

Figure 3:
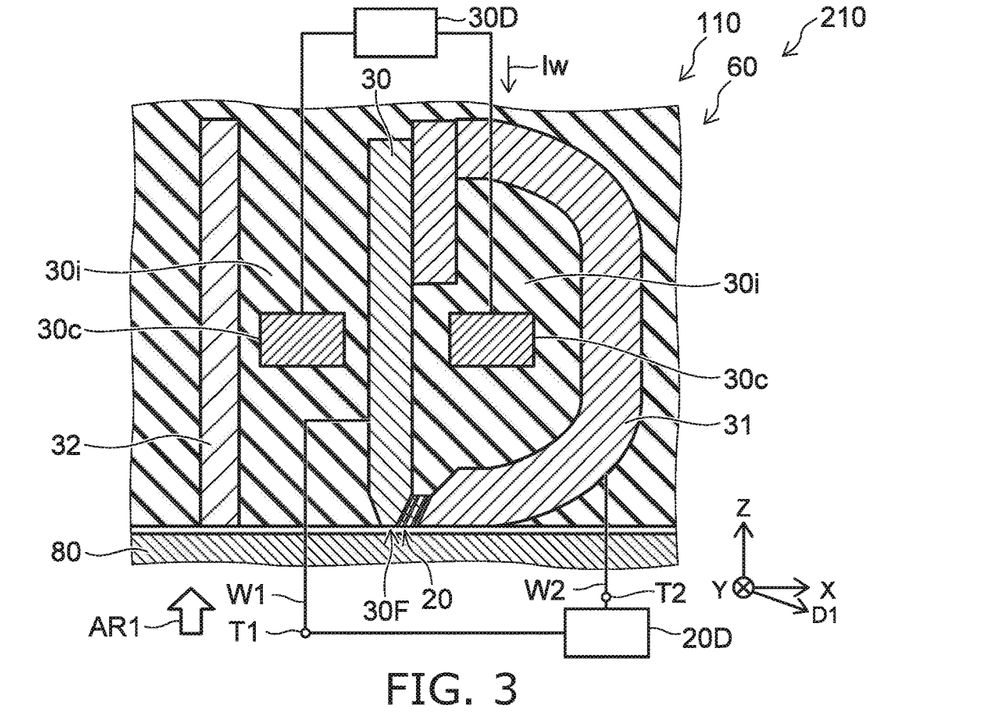
FIG. 3 is a schematic cross-sectional view illustrating the magnetic head according to the first embodiment.

FIG. 3 is a schematic cross-sectional view illustrating the magnetic head according to the first embodiment.

FIG. 1 is an enlarged view of a portion of FIG. 3.

As shown in FIG. 2, the magnetic head 110 according to the embodiment is used with a magnetic recording medium 80. The magnetic recording device 210 according to the embodiment includes the magnetic head 110 and the magnetic recording medium 80. In the example, the magnetic head 110 includes a recording portion 60 and a reproducing portion 70. Information is recorded in the magnetic recording medium 80 by the recording portion 60 of the magnetic head 110. The information that is recorded in the magnetic recording medium 80 is reproduced by the reproducing portion 70.

The magnetic recording medium 80 includes, for example, a medium substrate 82, and a magnetic recording layer 81 provided on the medium substrate 82. A magnetization 83 of the magnetic recording layer 81 is controlled by the recording portion 60.

The reproducing portion 70 includes, for example, a first reproduction magnetic shield 72a, a second reproduction magnetic shield 72b, and a magnetic reproducing element 71. The magnetic reproducing element 71 is provided between the first reproduction magnetic shield 72a and the second reproduction magnetic shield 72b. The magnetic reproducing element 71 can output a signal corresponding to the magnetization 83 of the magnetic recording layer 81.

As shown in FIG. 2, the recording portion 60 of the magnetic head 110 includes a magnetic pole 30, a first shield 31, and a stacked body 20. The stacked body 20 is provided between the magnetic pole 30 and the first shield 31.

As shown in FIG. 2, the magnetic recording medium 80 moves relative to the magnetic head 110 in the direction of a medium movement direction 85. Information that corresponds to the magnetization 83 of the magnetic recording layer 81 is controlled by the magnetic head 110 at any position. Information that corresponds to the magnetization 83 of the magnetic recording layer 81 is reproduced by the magnetic head 110 at any position.

As shown in FIG. 3, a coil 30c is provided in the magnetic head 110. A recording current Iw is supplied from a recording circuit 30D to the coil 30c. A recording magnetic field that corresponds to the recording current Iw is applied to the magnetic recording medium 80 from the magnetic pole 30. The magnetic pole 30 is, for example, a major magnetic pole. The first side shield is, for example, an auxiliary magnetic pole. A magnetic circuit is formed of the magnetic pole 30 and the first side shield.

As shown in FIG. 3, the magnetic pole 30 has a medium-opposing surface 30F. The medium-opposing surface 30F is, for example, an ABS (Air Bearing Surface). For example, the medium-opposing surface 30F opposes the magnetic recording medium 80.

A direction perpendicular to the medium-opposing surface 30F is taken as a Z-axis direction. One direction perpendicular to the Z-axis direction is taken as an X-axis direction. A direction perpendicular to the Z-axis direction and the X-axis direction is taken as a Y-axis direction.

The Z-axis direction is, for example, the height direction. The X-axis direction is, for example, the down-track direction. The Y-axis direction is, for example, the cross-track direction.

As shown in FIG. 3, an electrical circuit 20D is electrically connected to the stacked body 20. In the example, the stacked body 20 is electrically connected to the magnetic pole 30 and the first shield 31. A first terminal T1 and a second terminal T2 are provided in the magnetic head 110. The first terminal T1 is electrically connected to the stacked body 20 via wiring W1 and the magnetic pole 30. The second terminal T2 is electrically connected to the stacked body 20 via wiring W2 and the first shield 31. For example, a current (which may be, for example, a direct current) is supplied from the electrical circuit 20D to the stacked body 20. An alternating-current magnetic field (a rotating magnetic field) is generated from the stacked body 20 when the current flows in the stacked body 20. The alternating-current magnetic field is, for example, a high frequency magnetic field. The alternating-current magnetic field is applied to a portion of the magnetic recording medium 80. For example, at the portion of the magnetic recording medium 80 where the alternating-current magnetic field is applied, magnetic resonance is generated; and the orientation of the magnetization 83 changes easily. For example, MAMR (Microwave Assisted Magnetic Recording) is performed in the magnetic head 110.

As shown in FIG. 3, a second shield 32 may be provided in the recording portion 60. The magnetic pole 30 is provided between the second shield 32 and the first shield 31. An insulating portion 30i is provided around the first shield 31, the second shield 32, and the magnetic pole 30.

As shown in FIG. 1, the recording portion 60 of the magnetic head 110 includes the magnetic pole 30, a first magnetic layer 21, a second magnetic layer 22, a third magnetic layer 23, a first intermediate layer 41, a second intermediate layer 42, a third intermediate layer 43, and a fourth intermediate layer 44.

The stacked body 20 includes, for example, the first magnetic layer 21, the second magnetic layer 22, and the third magnetic layer 23. The stacked body 20 includes, for example, the second intermediate layer 42 and the third intermediate layer 43 in addition to the first magnetic layer 21, the second magnetic layer 22, and the third magnetic layer 23. The stacked body 20 may further include the first intermediate layer 41. The stacked body 20 may further include the fourth intermediate layer 44. The first magnetic layer 21 is provided between the magnetic pole 30 and the first shield 31. The second magnetic layer 22 is provided between the first magnetic layer 21 and the first shield 31. The third magnetic layer 23 is provided between the second magnetic layer 22 and the first shield 31.

The first intermediate layer 41 is provided between the magnetic pole 30 and the first magnetic layer 21. The second intermediate layer 42 is provided between the first magnetic layer 21 and the second magnetic layer 22. The third intermediate layer 43 is provided between the second magnetic layer 22 and the third magnetic layer 23. The fourth intermediate layer 44 is provided between the third magnetic layer 23 and the first shield 31. The first to fourth intermediate layers 41 to 44 are nonmagnetic.

The first intermediate layer 41 includes, for example, at least one selected from a first group consisting of Au, Cu, Ag, Al, and Ti. The second intermediate layer 42 includes at least one selected from a second group consisting of Ta, Ir, W, Mo, Cr, Tb, Rh, and Pd. The third intermediate layer 43 includes at least one selected from the first group recited above. The fourth intermediate layer 44 includes at least one selected from the second group recited above.

For example, it is considered that the material of the first group consisting of Au, Cu, Ag, Al, and Ti has the function of efficiently transferring the spin. The material of the first group is, for example, a good spin conductor. It is considered that the material of the second group consisting of Ta, Ir, W, Mo, Cr, Tb, Rh, and Pd has the function of making it difficult to transfer the spin. The material of the second group is, for example, a spin nonconductor.

By such a configuration, an alternating-current magnetic field is generated from the stacked body 20 when the current flows in the stacked body 20.

As shown in FIG. 1, the direction from the magnetic pole 30 toward the first shield 31 is taken as a first direction D1. The first direction D1 corresponds to the stacking direction of the stacked body 20. In one example, the first direction D1 is oblique to the medium-opposing surface 30F. The angle between the first direction D1 and the medium-opposing surface 30F is taken as an angle θ1. The angle θ1 is, for example, not less than 15 degrees and not more than 30 degrees. The angle θ1 may be 0 degrees.

As shown in FIG. 1, the first magnetic layer 21 has a first thickness t21 along the first direction D1 from the magnetic pole 30 toward the first shield 31. The second magnetic layer 22 has a second thickness t22 along the first direction D1. The third magnetic layer 23 has a third thickness t23 along the first direction D1. For example, the first direction D1 is aligned with the X-axis direction.

As shown in FIG. 1, the first intermediate layer 41 has a thickness t41 along the first direction D1. The second intermediate layer 42 has a thickness t42 along the first direction D1. The third intermediate layer 43 has a thickness t43 along the first direction D1. The fourth intermediate layer 44 has a thickness t44 along the first direction D1.

For example, there are cases where the alternating-current magnetic field generated from the stacked body 20 has a magnetic field having a positive rotation (e.g., counterclockwise), or a magnetic field having a negative rotation (e.g., clockwise). For example, it is considered that the magnetic field having the positive rotation has the action of assisting the recording magnetic field from the magnetic pole 30, and the magnetic field having the negative rotation has the action of weakening the recording magnetic field from the magnetic pole 30. An example of simulation results of the change of the magnetic field having the positive rotation or the negative rotation for the alternating-current magnetic field generated from the stacked body 20 when changing the materials of the intermediate layers recited above will now be described.

Figure 4:
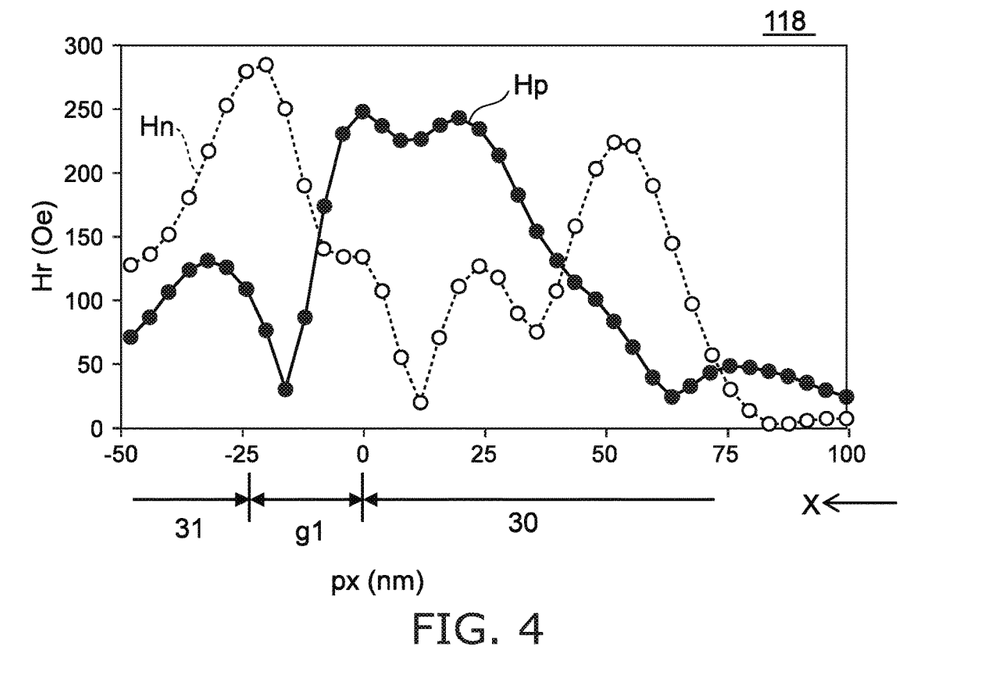
FIG. 4 is a graph illustrating characteristics of a magnetic head.
Figure 5:
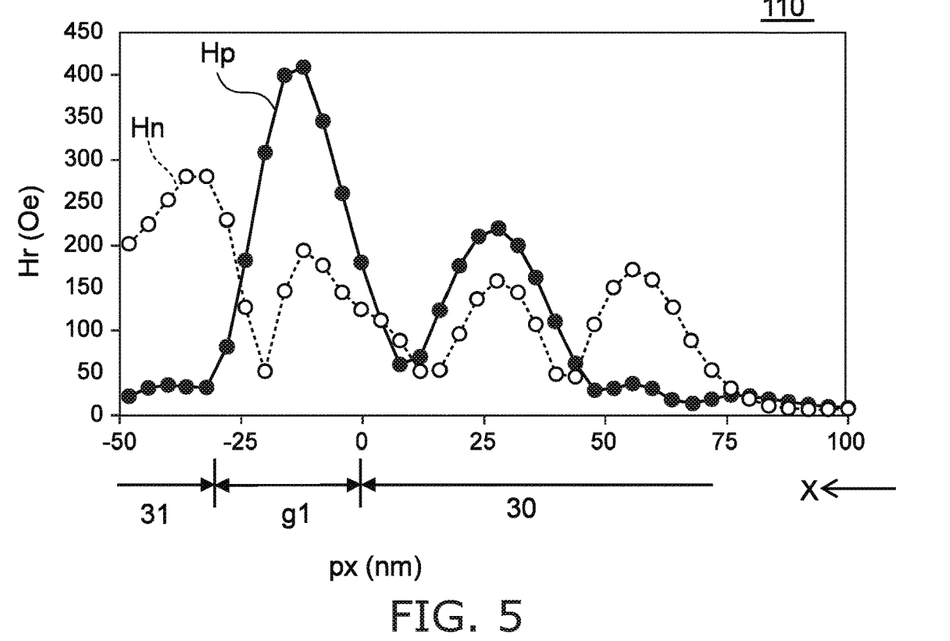
FIG. 5 is a graph illustrating characteristics of the magnetic head.

FIG. 4 and FIG. 5 are graphs illustrating characteristics of magnetic heads.

FIG. 4 corresponds to a magnetic head 118 of a reference example. In the magnetic head 118, the first magnetic layer 21 and the second magnetic layer 22 are provided between the magnetic pole 30 and the first shield 31, and the third magnetic layer 23 is not provided. In the magnetic head 118, the first intermediate layer 41 between the magnetic pole 30 and the first magnetic layer 21 includes the material of the second group recited above. The second intermediate layer 42 between the first magnetic layer 21 and the second magnetic layer 22 includes the material of the first group recited above. An intermediate layer between the second magnetic layer 22 and the first shield 31 includes the material of the second group recited above.

FIG. 5 corresponds to the magnetic head 110 according to the embodiment. In the magnetic head 110, the first intermediate layer 41 and the third intermediate layer 43 include the material of the first group recited above, and the second intermediate layer 42 and the fourth intermediate layer 44 include the material of the second group recited above.

FIG. 4 and FIG. 5 illustrate the characteristics of the intensity of the rotating magnetic field on a line aligned with the X-axis direction and passing through the Y-axis direction center of the magnetic pole 30. In FIG. 4 and FIG. 5, the horizontal axis is a position px (nm) in the X-axis direction. The position where the position px is 0 corresponds to the position of the end of the magnetic pole 30 on the side opposing the first shield 31. In FIG. 4 and FIG. 5, the vertical axis is a rotating magnetic field intensity Hr (Oe). An intensity Hp of the positive rotating magnetic field and an intensity Hn of the negative rotating magnetic field are illustrated in FIG. 4 and FIG. 5.

In the model of the simulation of the magnetic head 118, the physical property values of $Fe_{60}Co_{40}$ are used as the physical property values of the first magnetic layer 21. A saturation magnetization Ms of the first magnetic layer 21 is 2.4 T. The first thickness t21 of the first magnetic layer 21 is 9 nm. The physical property values of $Ni_{70}Fe_{30}$ are used as the physical property values of the second magnetic layer 22. The saturation magnetization Ms of the second magnetic layer 22 is 1 T. The second thickness t22 of the second magnetic layer 22 is 3 nm. The distance of a region g1 between the magnetic pole 30 and the first shield 31 (referring to FIG. 4) is 24 nm.

In the model of the simulation of the magnetic head 110, the physical property values of $Fe_{60}Co_{40}$ are used as the physical property values of the first magnetic layer 21. The saturation magnetization Ms of the first magnetic layer 21 is 2.4 T. The first thickness t21 of the first magnetic layer 21 is 6 nm. The physical property values of $Fe_{60}Co_{40}$ are used as the physical property values of the second magnetic layer 22. The saturation magnetization Ms of the second magnetic layer 22 is 2.4 T. The second thickness t22 of the second magnetic layer 22 is 9 nm. The physical property values of $Ni_{70}Fe_{30}$ are used as the physical property values of the third magnetic layer 23. The saturation magnetization Ms of the third magnetic layer 23 is 1 T. The third thickness t23 of the third magnetic layer 23 is 3 nm. The thickness t41 of the first intermediate layer 41 is 3 nm. The thickness t42 of the second intermediate layer 42 is 3 nm. The thickness t43 of the third intermediate layer 43 is 3 nm. The thickness t44 of the fourth intermediate layer 44 is 3 nm. The distance of the region g1 between the magnetic pole 30 and the first shield 31 (referring to FIG. 4) is 30 nm.

In the magnetic head 118 as shown in FIG. 4, the intensity Hp of the positive rotating magnetic field is about the same as the intensity Hn of the negative rotating magnetic field in the region g1 between the magnetic pole 30 and the first shield 31. The intensity Hn of the negative rotating magnetic field is higher than the intensity Hp of the positive rotating magnetic field in the portion of the region g1 proximal to the first shield 31. In the magnetic head 118, at the position in the magnetic recording medium 80 opposing the first shield 31 after opposing the magnetic pole 30, the effects of the negative rotating magnetic field are large; therefore, the recording magnetic field from the magnetic pole 30 is weakened; and the assist effect due to the rotating magnetic field is not obtained sufficiently.

Conversely, in the magnetic head 110 as shown in FIG. 5, the intensity Hp of the positive rotating magnetic field is higher than the intensity Hn of the negative rotating magnetic field in the region g1 between the magnetic pole 30 and the first shield 31. In particular, the intensity Hp of the positive rotating magnetic field is markedly high compared to the intensity Hn of the negative rotating magnetic field in the portion of the region g1 proximal to the first shield 31. In the magnetic head 110, at the position in the magnetic recording medium 80 opposing the first shield 31 after opposing the magnetic pole 30, the recording magnetic field from the magnetic pole 30 can be assisted effectively by the positive rotating magnetic field having the high intensity.

As shown in FIG. 4, the maximum value of the intensity Hp of the positive rotating magnetic field in the magnetic head 118 is about 260 Oe. Conversely, the maximum value of the intensity Hp of the positive rotating magnetic field in the magnetic head 110 is about 420 Oe. Thus, in the magnetic head 110, a high intensity Hp of the positive rotating magnetic field is obtained.

Thus, it was found that compared to the magnetic head 118 of the reference example, good characteristics are obtained in the magnetic head 110 in which the first to third magnetic layers 21 to 23 are provided, the first intermediate layer 41 and the third intermediate layer 43 include the material of the first group recited above, and the second intermediate layer 42 and the fourth intermediate layer 44 include the material of the second group recited above.

As recited above, there are cases where the recording magnetic field is weakened by the rotating magnetic field generated from the stacked body 20. According to the embodiment, the weakening of the recording magnetic field due to the rotating magnetic field is suppressed. According to the embodiment, good MAMR can be performed. According to the embodiment, a magnetic head can be provided in which the recording density can be increased.

Figure 6:
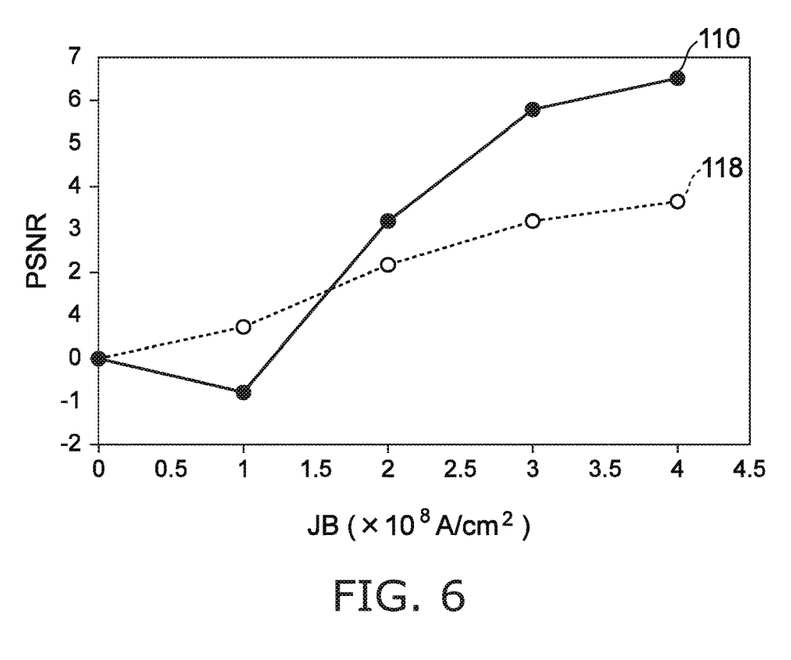
FIG. 6 is a graph illustrating characteristics of the magnetic heads.

FIG. 6 is a graph illustrating characteristics of the magnetic heads.

FIG. 6 shows an example of simulation results of the SNR improvement characteristic when changing the bias current density for the magnetic head 110 and the magnetic head 118 recited above. The horizontal axis of FIG. 6 is a current density JB ($\times 10^8$ A/cm$^2$) of the bias current supplied to the stacked body 20. The vertical axis of FIG. 6 is a parameter PSNR relating to the improvement effect of the SNR (Signal-Nose-Ratio). The parameter PSNR corresponds to the SNR for a recording time of 2 T when the bias current density is the current density JB when referenced to the SNR (Signal-Nose-Ratio) for a recording time of 2 T when the bias current density is 0. In the example, the linear recording density is 2300 kFCI.

As shown in FIG. 6, the parameter PSNR of the magnetic head 110 is larger than the parameter PSNR of the magnetic head 118 when the current density JB is about $2 \times 10^8$ cm$^2$ or more. For example, when the current density JB is about $3 \times 10^8$ cm$^2$, the magnetic head 110 has an SNR improvement effect of 2.6 dB with respect to the magnetic head 118. In the embodiment, it is favorable for the current density JB of the current flowing in the stacked body 20 to be $2 \times 10^8$ cm$^2$ or more.

For example, it is considered that the third magnetic layer 23 functions as a spin injection layer. For example, it is considered that the second magnetic layer 22 functions as an oscillation generation layer. For example, it is considered that the first magnetic layer 21 functions to suppress the magnetic field having the negative rotation.

Figure 7A:
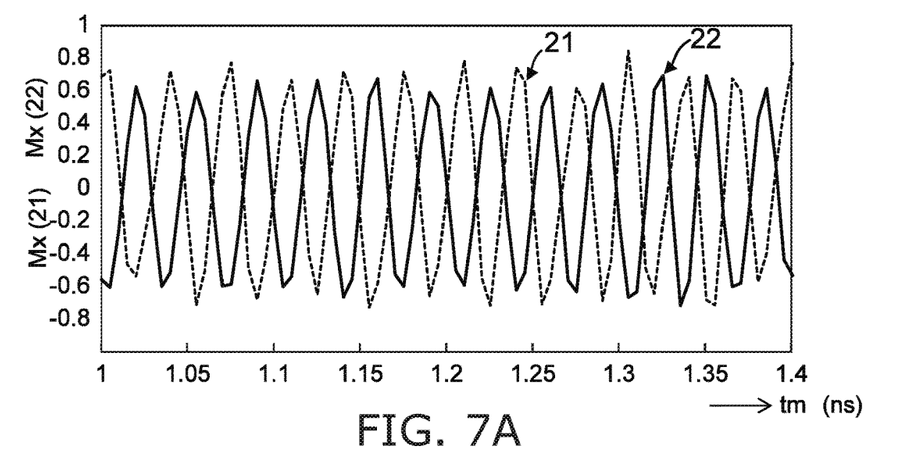
FIG. 7A to FIG. 7C are graphs illustrating characteristics of the magnetic head according to the first embodiment.
Figure 7B:
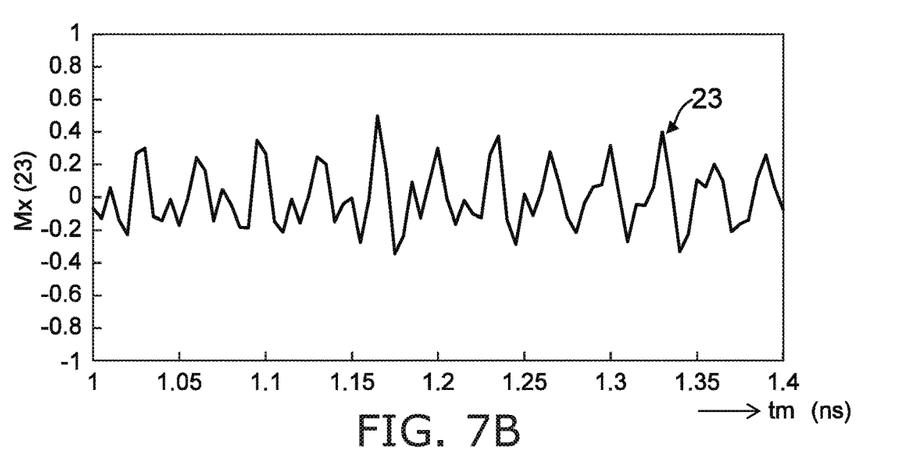
Figure 7C:
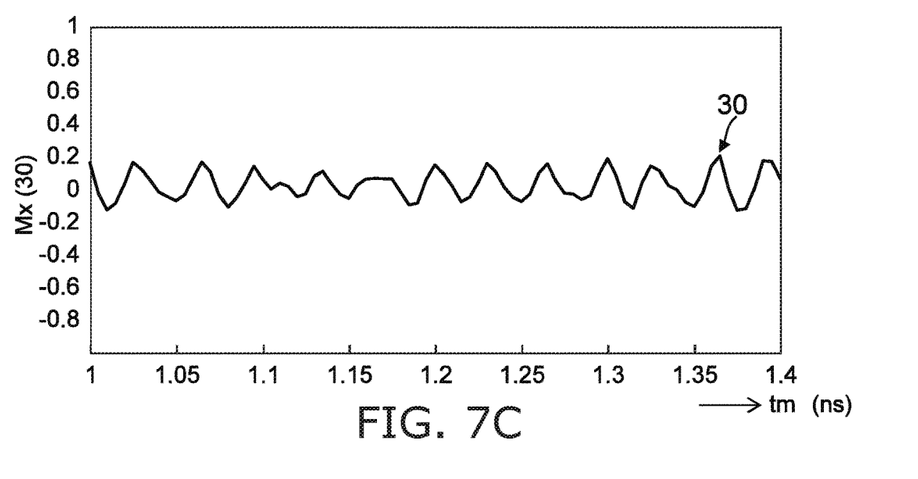

FIG. 7A to FIG. 7C are graphs illustrating characteristics of the magnetic head according to the first embodiment.

In these figures, the horizontal axis is a time tm (ns). In these figures, the vertical axis is a magnetization Mx. FIG. 7A shows the magnetization Mx(21) of the first magnetic layer 21 and the magnetization Mx(22) of the second magnetic layer 22. FIG. 7B shows the magnetization Mx(23) of the third magnetic layer 23. FIG. 7C shows the magnetization Mx(30) of the magnetic pole 30. In these figures, the current density JB of the bias current is $3 \times 10^8$ A/cm$^2$.

As shown in FIG. 7A, the magnetization Mx(21) of the first magnetic layer 21 and the magnetization Mx(22) of the second magnetic layer 22 oscillate stably. The phase of the magnetization Mx(21) of the first magnetic layer 21 is the reverse of the phase of the magnetization Mx(22) of the second magnetic layer 22. For example, it is considered that the first magnetic layer 21 is magnetostatically coupled with the second magnetic layer 22 and promotes the oscillation of the second magnetic layer 22.

Figure 8:
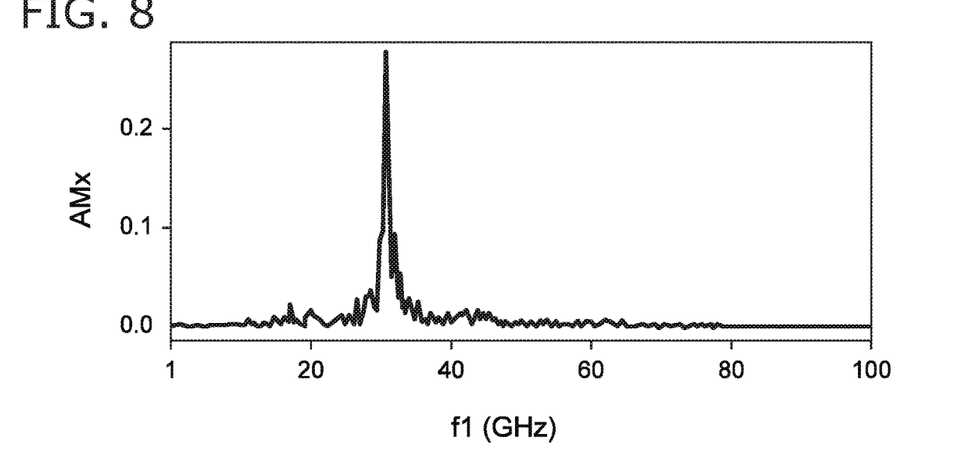
FIG. 8 is a graph illustrating characteristics of the magnetic head according to the first embodiment.

FIG. 8 is a graph illustrating characteristics of the magnetic head according to the first embodiment.

FIG. 8 illustrates the results of Fourier transforms of the oscillation characteristics of FIG. 7A to FIG. 7C. The horizontal axis of FIG. 8 is a frequency f1 (GHz). The vertical axis is an absolute value AMx of the magnetization Mx. As shown in FIG. 8, the absolute value AMx of the magnetization Mx has a sharp peak. Stable oscillations are obtained.

Figure 9:
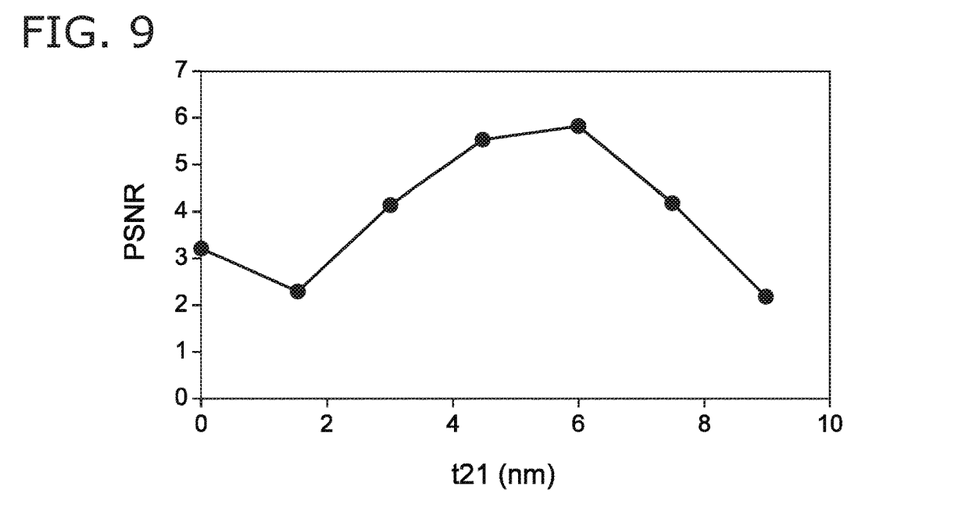
FIG. 9 is a graph illustrating a characteristic of the magnetic head.

FIG. 9 is a graph illustrating a characteristic of the magnetic head.

FIG. 9 illustrates simulation results of the parameter PSNR when the first thickness t21 of the first magnetic layer 21 is changed. It can be seen from FIG. 9 that a large parameter PSNR is obtained when the first thickness t21 is not less than 2.5 nm and not more than 8 nm. In the embodiment, it is favorable for the first thickness t21 to be not less than 2.5 nm and not more than 8 nm. In the embodiment, the first thickness t21 may be not less than 3 nm and not more than 7.5 nm. A larger parameter PSNR is obtained.

In the embodiment, for example, the first intermediate layer 41 contacts the first magnetic layer 21. For example, the second intermediate layer 42 contacts the first magnetic layer 21 and the second magnetic layer 22. For example, the third intermediate layer 43 contacts the second magnetic layer 22 and the third magnetic layer 23. For example, the fourth intermediate layer 44 contacts the third magnetic layer 23. For example, the first intermediate layer 41 contacts the magnetic pole 30. For example, the fourth intermediate layer 44 contacts the first shield 31.

In one example, the first thickness t21 of the first magnetic layer 21 is thinner than the second thickness t22 of the second magnetic layer 22. The first thickness t21 is thicker than the third thickness t23 of the third magnetic layer 23.

As described above, the first thickness t21 is, for example, not less than 2.5 nm and not more than 8 nm.

The second thickness t22 is, for example, greater than 5 nm and not more than 15 nm. The second thickness t22 is about 9 nm.

The third thickness t23 is, for example, not less than 1 nm but less than 5 nm. The third thickness t23 is about 3 nm.

The first magnetic layer 21 has a first saturation magnetic flux density. The second magnetic layer 22 has a second saturation magnetic flux density. The third magnetic layer 23 has a third saturation magnetic flux density.

A first product of the first saturation magnetic flux density and the first thickness t21 is smaller than a second product of the second saturation magnetic flux density and the second thickness t22. The first product is larger than a third product of the third saturation magnetic flux density and the third thickness t23. By such a relationship, for example, the magnetostatic coupling between the first magnetic layer 21 and the second magnetic layer 22 is easy. For example, the oscillation of the second magnetic layer 22 is promoted. For example, the generation of the negative rotating magnetic field is suppressed.

The thickness t41 is, for example, not less than 1 nm and not more than 4 nm. The thickness t42 is, for example, not less than 1 nm and not more than 5 nm. The thickness t43 is, for example, not less than 1 nm and not more than 5 nm. The thickness t44 is, for example, not less than 1 nm and not more than 10 nm. Because the thickness t41 is not more than 4 nm, the oscillation of the first magnetic layer 21 is stable. For example, a large parameter PSNR is obtained easily.

In the embodiment, at least one of the first to third magnetic layers 21 to 23 includes at least one selected from the group consisting of Fe, Co, and Ni.

In the embodiment, it is favorable for the thickness of the stacked body 20 to be 25 nm or less. Thereby, for example, a good recording magnetic field gradient is obtained.

An example of simulation results of characteristics of the stacked body 20 when a current is caused to flow in the stacked body 20 will now be described.

Figure 10:
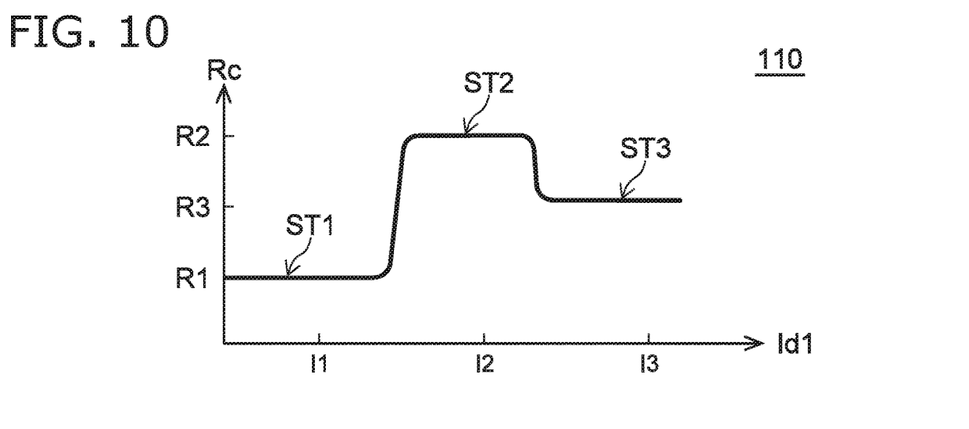
FIG. 10 is a graph illustrating a characteristic of the magnetic head.

FIG. 10 is a graph illustrating a characteristic of the magnetic head.

FIG. 10 corresponds to the magnetic head 110. The horizontal axis of FIG. 10 corresponds to a current Id1 flowing in the stacked body 20. In this figure, the vertical axis corresponds to an electrical resistance Rc of the stacked body 20. For example, the current Id1 corresponds to a current flowing in a current path including the first terminal T1 and the second terminal T2. The current Id1 has a first orientation from the first magnetic layer 21 toward the third magnetic layer 23. For example, the first orientation corresponds to the orientation from the first terminal T1 toward the second terminal T2. For example, the first orientation corresponds to the orientation from the wiring W1 toward the wiring W2. An electron current flows in the reverse orientation of the current Id1.

In the magnetic head 110 as shown in FIG. 10, as the magnitude of the current Id1 increases, the magnitude increases once and subsequently decreases. For example, the stacked body 20 has a first electrical resistance R1 when a first current I1 having the first orientation recited above is caused to flow in the stacked body 20. The stacked body 20 has a second electrical resistance R2 when a second current I2 having the first orientation is caused to flow in the stacked body 20. The second current I2 is larger than the first current I1. The stacked body 20 has a third electrical resistance R3 when a third current I3 having the first orientation is caused to flow in the stacked body 20. The third current I3 is larger than the second current I2. As shown in FIG. 10, the second electrical resistance R2 is higher than the first electrical resistance R1 and higher than the third electrical resistance R3.

In the magnetic head 110 as in the example, there are cases where the electrical resistance Rc changes in three stages. It can be estimated that such a change of the electrical resistance Rc corresponds to the change of the orientation of the magnetization of the magnetic layer. An example of the state of the magnetization of the magnetic head 110 will now be described.

FIG. 11A to FIG. 11D are schematic views illustrating characteristics of the magnetic head.

Figure 11A:
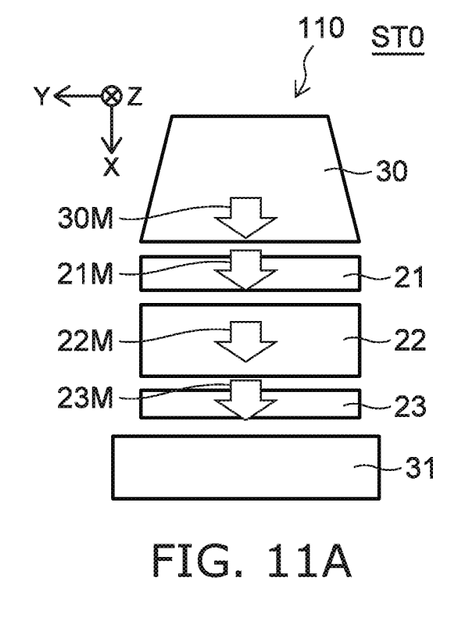
FIG. 11A to FIG. 11D are schematic views illustrating characteristics of the magnetic head.
Figure 11B:
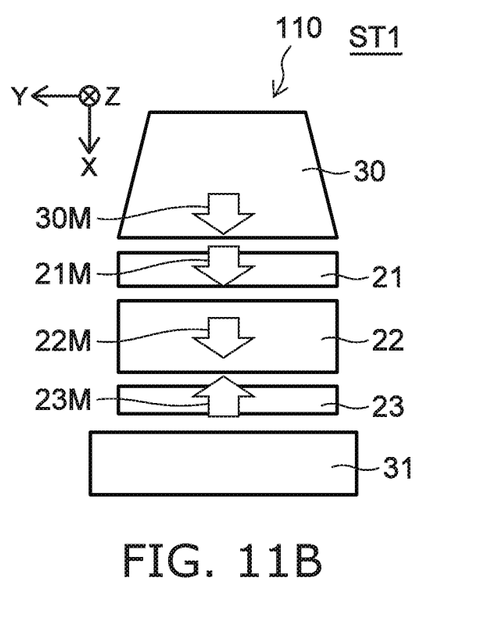
Figure 11C:
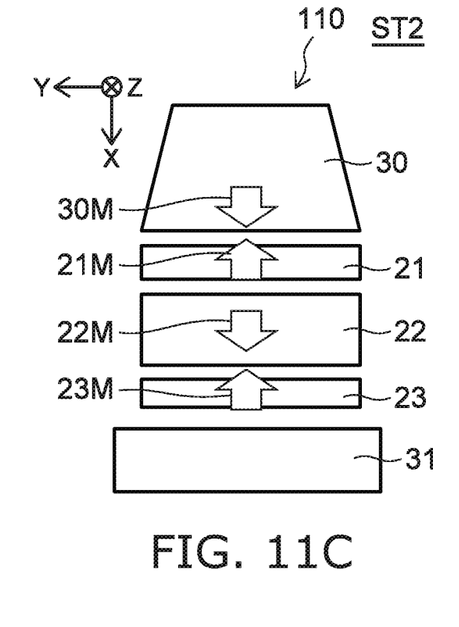
Figure 11D:
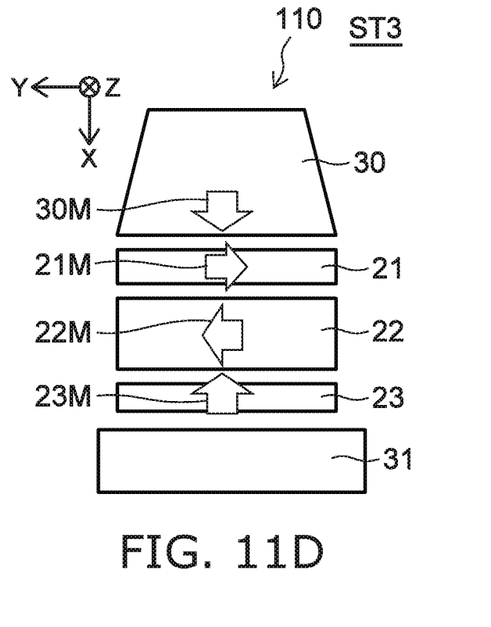

FIG. 11A to FIG. 11D correspond to the magnetic head 110. FIG. 11A corresponds to a state ST0 in which a current does not flow in the stacked body 20. FIG. 11B corresponds to a first state ST1 in which the first current I1 is supplied to the stacked body 20. FIG. 11C corresponds to a second state ST2 in which the second current I2 is supplied to the stacked body 20. FIG. 11D corresponds to a third state ST3 in which the third current I3 is supplied to the stacked body 20.

In the magnetic head 110 as shown in FIG. 11A, a magnetization 30M of the magnetic pole 30, a magnetization 21M of the first magnetic layer 21, a magnetization 22M of the second magnetic layer 22, and a magnetization 23M of the third magnetic layer 23 are "parallel" to each other in the state ST0. As shown in FIG. 11B, the magnetization 23M is reversed in the first state ST1. As shown in FIG. 11C, the magnetization 21M is reversed in the second state ST2. As shown in FIG. 11D, the magnetization 21M and the magnetization 22M are antiparallel in the third state ST3. The magnetization 30M and the magnetization 23M cross each other. For example, the magnetization 30M and the magnetization 23M oscillate in the third state ST3. Thereby, an alternating-current magnetic field is generated from the stacked body 20; and the alternating-current magnetic field is utilized effectively.

It is considered that such changes of the magnetizations of the magnetic head 110 have a relationship with the change of the electrical resistance Rc illustrated in FIG. 10.

In the embodiment, a current flows from the magnetic pole 30 toward the first shield 31 when the information is recorded in the magnetic recording medium 80 by the magnetic head 110. The alternating-current magnetic field (e.g., the high frequency magnetic field) is generated thereby. For example, the alternating-current magnetic field is generated from the stacked body 20 when the recording magnetic field is generated from the magnetic pole 30 and the current flows from the magnetic pole 30 toward the first shield 31. The recording magnetic field is applied to the stacked body 20.

SECOND EMBODIMENT

A second embodiment relates to the magnetic recording device 210. The magnetic recording device 210 includes the magnetic head 110, and the magnetic recording medium 80 in which the information is recorded by the magnetic head 110. An example of the magnetic recording device according to the embodiment will now be described. The magnetic recording device may be a magnetic recording and reproducing device. The magnetic head may include a recording portion and a reproducing portion.

Figure 12:
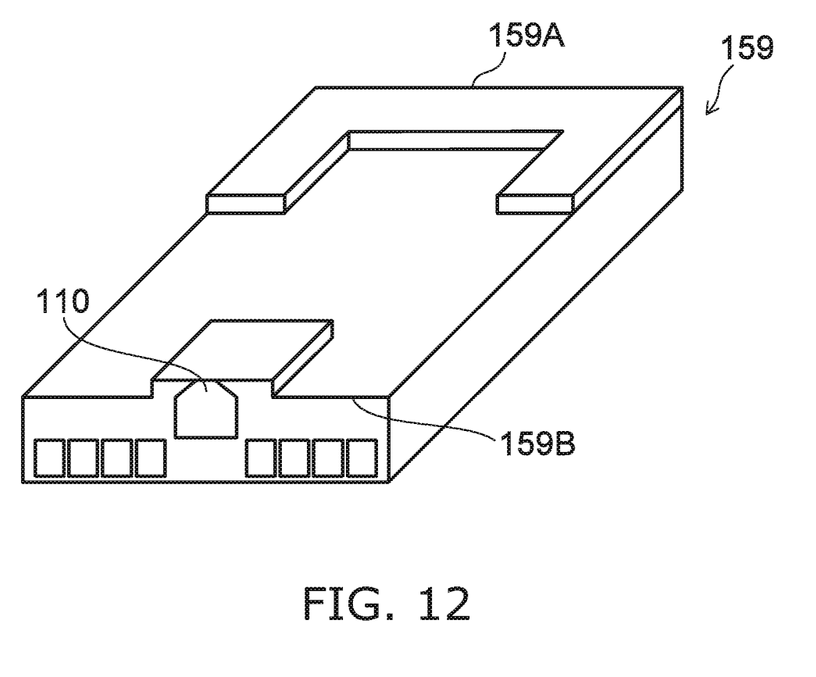
FIG. 12 is a schematic perspective view illustrating a portion of the magnetic recording device according to the second embodiment.

FIG. 12 is a schematic perspective view illustrating a portion of the magnetic recording device according to the second embodiment.

FIG. 12 illustrates a head slider. The magnetic head 110 is provided in the head slider 159. The head slider 159 includes, for example, $Al_2O_3$/TiC, etc. The head slider 159 moves relative to the magnetic recording medium while flying over or contacting the magnetic recording medium.

The head slider 159 has, for example, an air inflow side 159A and an air outflow side 159B. The magnetic head 110 is disposed at the side surface of the air outflow side 159B of the head slider 159 or the like. Thereby, the magnetic head 110 moves relative to the magnetic recording medium while flying over or contacting the magnetic recording medium.

Figure 13:
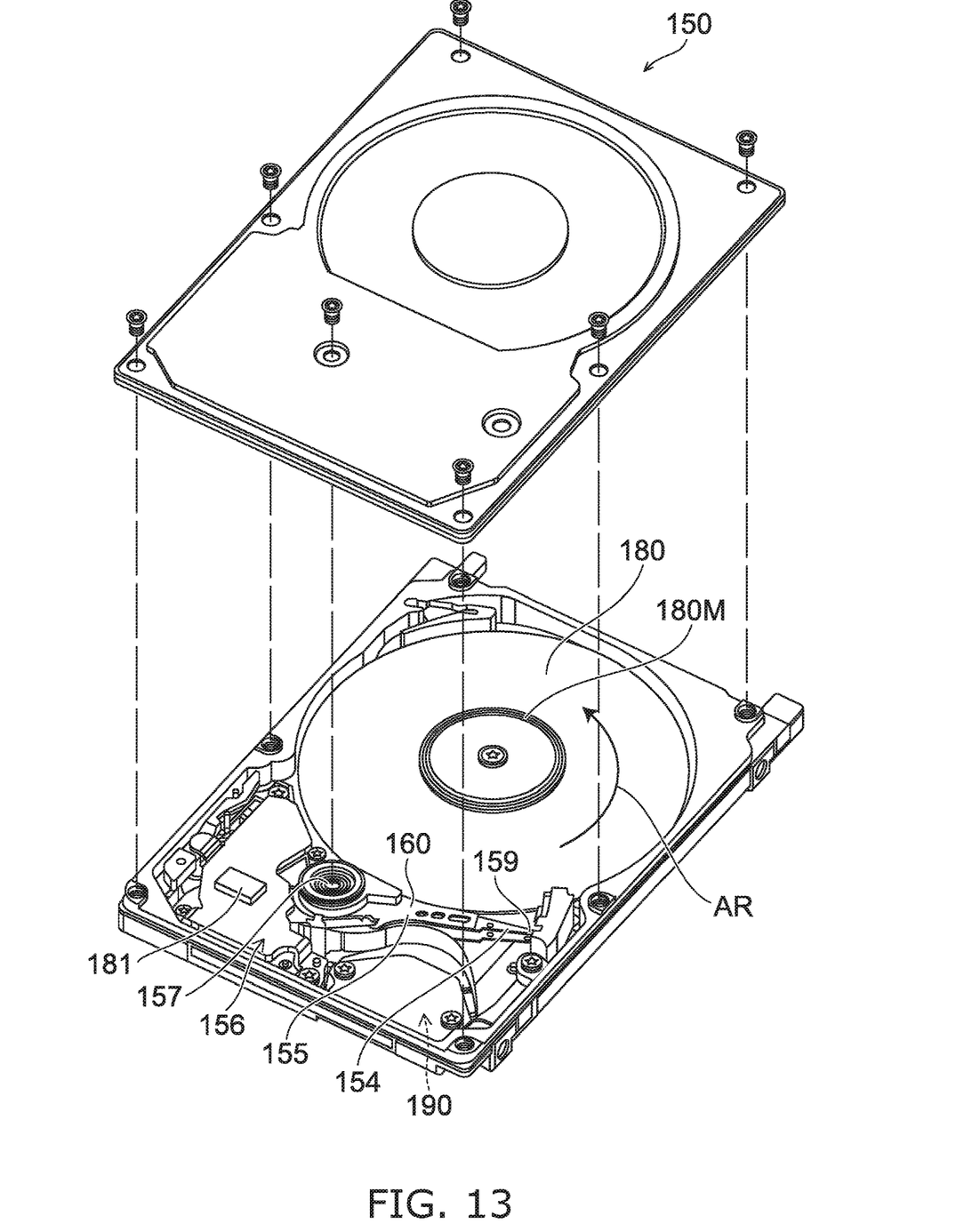
FIG. 13 is a schematic perspective view illustrating the magnetic recording device according to the second embodiment.

FIG. 13 is a schematic perspective view illustrating the magnetic recording device according to the second embodiment.

Figure 14A:
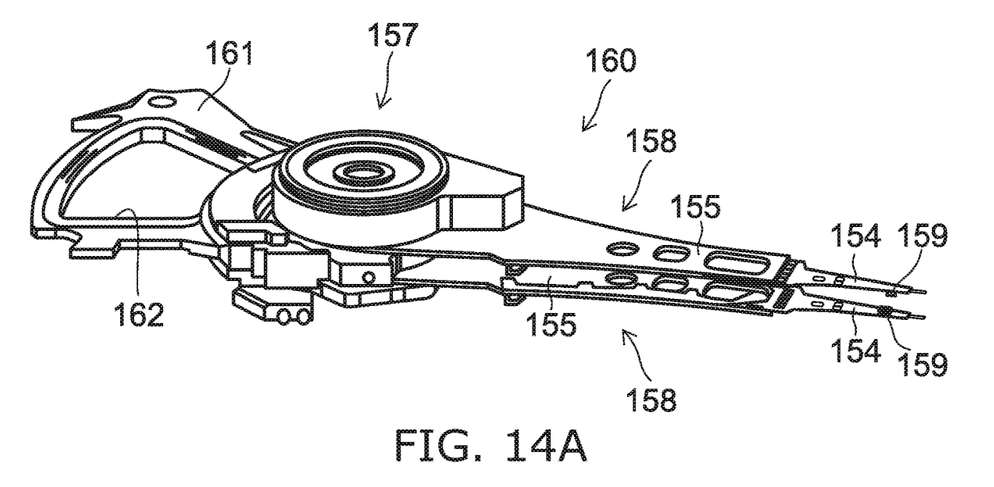
FIG. 14A and FIG. 14B are schematic perspective views illustrating a portion of the magnetic recording device according to the second embodiment.
Figure 14B:
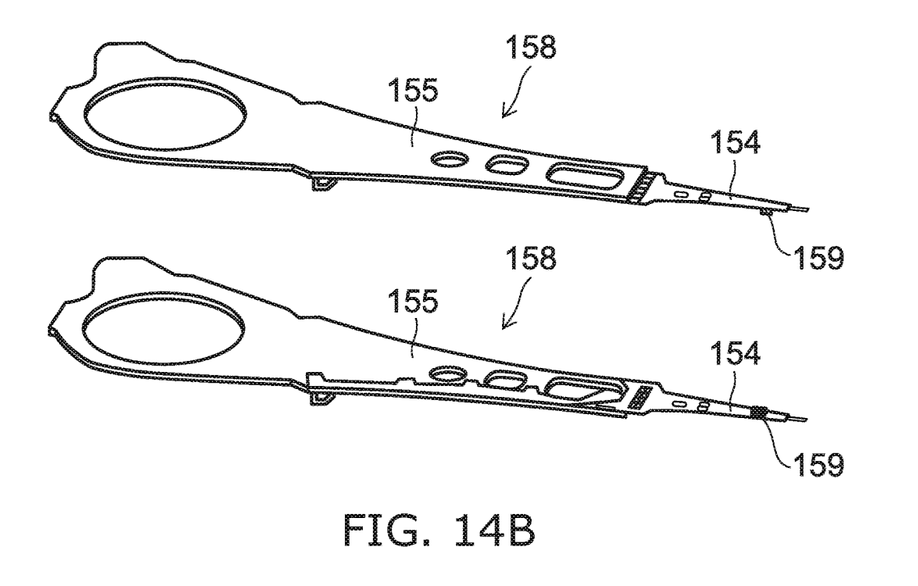

FIG. 14A and FIG. 14B are schematic perspective views illustrating a portion of the magnetic recording device according to the second embodiment.

As shown in FIG. 13, a rotary actuator is used in the magnetic recording device 150 according to the embodiment. A recording medium disk 180 is mounted to a spindle motor 180M. The recording medium disk 180 is rotated in the direction of arrow AR by the spindle motor 180M. The spindle motor 180M responds to a control signal from a drive device controller. The magnetic recording device 150 according to the embodiment may include multiple recording medium disks 180. The magnetic recording device 150 may include a recording medium 181. The recording medium 181 is, for example, a SSD (Solid State Drive). The recording medium 181 includes, for example, nonvolatile memory such as flash memory, etc. For example, the magnetic recording device 150 may be a hybrid HDD (Hard Disk Drive).

The head slider 159 records and reproduces the information recorded in the recording medium disk 180. The head slider 159 is provided at the tip of a suspension 154 having a thin-film configuration. The magnetic head according to the embodiment is provided at the tip vicinity of the head slider 159.

When the recording medium disk 180 rotates, the downward pressure due to the suspension 154 and the pressure generated in the medium-opposing surface (the ABS) of the head slider 159 are balanced. The distance between the medium-opposing surface of the head slider 159 and the surface of the recording medium disk 180 becomes a prescribed fly height. In the embodiment, the head slider 159 may contact the recording medium disk 180. For example, contact-sliding is applicable.

The suspension 154 is connected to one end of an arm 155 (e.g., an actuator arm). The arm 155 includes, for example, a bobbin part, etc. The bobbin part holds a drive coil. A voice coil motor 156 is provided at the other end of the arm 155. The voice coil motor 156 is one type of linear motor. The voice coil motor 156 includes, for example, the drive coil and a magnetic circuit. The drive coil is wound onto the bobbin part of the arm 155. The magnetic circuit includes a permanent magnet and an opposing yoke. The drive coil is provided between the permanent magnet and the opposing yoke. The suspension 154 has one end and another end. The magnetic head is provided at the one end of the suspension 154. The arm 155 is connected to the other end of the suspension 154.

The arm 155 is held by ball bearings. The ball bearings are provided at two locations above and below a bearing part 157. The arm 155 can rotate and slide due to the voice coil motor 156. The magnetic head is movable to any position of the recording medium disk 180.

FIG. 14A illustrates the configuration of a portion of the magnetic recording device and is an enlarged perspective view of a head stack assembly 160.

FIG. 14B is a perspective view illustrating a magnetic head assembly (head gimbal assembly (HGA)) 158 that is a portion of the head stack assembly 160.

As shown in FIG. 14A, the head stack assembly 160 includes the bearing part 157, the head gimbal assembly 158, and a support frame 161. The head gimbal assembly 158 extends from the bearing part 157. The support frame 161 extends from the bearing part 157. The direction in which the support frame 161 extends is the reverse of the direction in which the head gimbal assembly 158 extends. The support frame 161 supports a coil 162 of the voice coil motor 156.

As shown in FIG. 14B, the head gimbal assembly 158 includes the arm 155 extending from the bearing part 157, and the suspension 154 extending from the arm 155.

The head slider 159 is provided at the tip of the suspension 154. The magnetic head according to the embodiment is provided at the head slider 159.

The magnetic head assembly (the head gimbal assembly) 158 according to the embodiment includes the magnetic head according to the embodiment, the head slider 159 on which the magnetic head is provided, the suspension 154, and the arm 155. The head slider 159 is provided at one end of the suspension 154. The arm 155 is connected to the other end of the suspension 154.

The suspension 154 includes, for example, lead wires (not illustrated) for recording and reproducing signals. The suspension 154 may include, for example, lead wires (not illustrated) for a heater that adjusts the fly height. The suspension 154 may include, for example, lead wires (not illustrated) for a spin torque oscillator, etc. These lead wires are electrically connected to multiple electrodes provided in the magnetic head.

A signal processor 190 is provided in the magnetic recording device 150. The signal processor 190 records and reproduces the signals to and from the magnetic recording medium by using the magnetic head. For example, the signal processor 190 is electrically connected to the magnetic head by the input/output lines of the signal processor 190 being connected to electrode pads of the head gimbal assembly 158.

The magnetic recording device 150 according to the embodiment includes a magnetic recording medium, the magnetic head according to the embodiment, a movable part, a position controller, and a signal processor. The movable part causes the magnetic recording medium and the magnetic head to separate or causes the magnetic recording medium and the magnetic head to be movable relative to each other in a state of contact. The position controller aligns the magnetic head at a prescribed recording position of the magnetic recording medium. The signal processor records and reproduces the signals to and from the magnetic recording medium by using the magnetic head.

For example, the recording medium disk 180 is used as the magnetic recording medium recited above. The movable part recited above includes, for example, the head slider 159. The position controller recited above includes, for example, the head gimbal assembly 158.

The embodiments may include the following configurations (e.g., technological proposals).

Configuration 1

A magnetic head, comprising:

a magnetic pole;

a first shield;

a first magnetic layer provided between the magnetic pole and the first shield;

a second magnetic layer provided between the first magnetic layer and the first shield;

a third magnetic layer provided between the second magnetic layer and the first shield;

a first intermediate layer provided between the magnetic pole and the first magnetic layer, the first intermediate layer including at least one selected from a first group consisting of Au, Cu, Ag, Al, and Ti;

a second intermediate layer provided between the first magnetic layer and the second magnetic layer, the second intermediate layer including at least one selected from a second group consisting of Ta, Ir, W, Mo, Cr, Tb, Rh, and Pd;

a third intermediate layer including at least one selected from the first group and being provided between the second magnetic layer and the third magnetic layer; and a fourth intermediate layer including at least one selected from the second group and being provided between the third magnetic layer and the first shield.

Configuration 2

The magnetic head according to Configuration 1, wherein the first magnetic layer has a first saturation magnetic flux density and a first thickness, the first thickness being along a first direction, the first direction being from the magnetic pole toward the first shield, the second magnetic layer has a second saturation magnetic flux density and a second thickness, the second thickness being along the first direction, and a first product of the first saturation magnetic flux density and the first thickness is smaller than a second product of the second saturation magnetic flux density and the second thickness.

Configuration 3

The magnetic head according to Configuration 2, wherein the third magnetic layer has a third saturation magnetic flux density and a third thickness, the third thickness being along the first direction, and the first product is larger than a third product of the third saturation magnetic flux density and the third thickness.

Configuration 4

The magnetic head according to Configuration 1, wherein a first thickness of the first magnetic layer along a first direction is thinner than a second thickness of the second magnetic layer along the first direction, the first direction being from the magnetic pole toward the first shield.

Configuration 5

The magnetic head according to Configuration 4, wherein the first thickness is thicker than a third thickness of the third magnetic layer along the first direction.

Configuration 6

The magnetic head according to Configuration 1, wherein a first thickness of the first magnetic layer along a first direction is not less than 2.5 nm and not more than 8 nm, the first direction being from the magnetic pole toward the first shield.

Configuration 7

The magnetic head according to Configuration 6, wherein a second thickness of the second magnetic layer along the first direction is greater than 5 nm and not more than 15 nm.

Configuration 8

The magnetic head according to Configuration 6 or 7, wherein a third thickness of the third magnetic layer along the first direction is not less than 1 nm but less than 5 nm.

Configuration 9

The magnetic head according to any one of Configurations 6 to 8, wherein a thickness of the first intermediate layer along the first direction is not less than 1 nm and not more than 4 nm.

Configuration 10

The magnetic head according to any one of Configurations 6 to 9, wherein a thickness of the second intermediate layer along the first direction is not less than 1 nm and not more than 5 nm.

Configuration 11

The magnetic head according to any one of Configurations 6 to 10, wherein a thickness of the third intermediate layer along the first direction is not less than 1 nm and not more than 5 nm.

Configuration 12

The magnetic head according to any one of Configurations 6 to 11, wherein a thickness of the fourth intermediate layer along the first direction is not less than 1 nm and not more than 10 nm.

Configuration 13

The magnetic head according to any one of Configurations 6 to 12, wherein a length along the first direction of a stacked body is 25 nm or less, the stacked body including the first magnetic layer, the second intermediate layer, the second magnetic layer, the third intermediate layer, and the third magnetic layer.

Configuration 14

The magnetic head according to any one of Configurations 1 to 12, wherein a current density of a current flowing in a stacked body is $2 \times 10^8$ cm$^2$ or more, the stacked body including the first magnetic layer, the second intermediate layer, the second magnetic layer, the third intermediate layer, and the third magnetic layer.

Configuration 15

The magnetic head according to any one of Configurations 1 to 14, wherein
the first intermediate layer contacts the first magnetic layer,
the second intermediate layer contacts the first magnetic layer and the second magnetic layer,
the third intermediate layer contacts the second magnetic layer and the third magnetic layer, and
the fourth intermediate layer contacts the third magnetic layer.

Configuration 16

The magnetic head according to Configuration 15, wherein the first intermediate layer contacts the magnetic pole.

Configuration 17

The magnetic head according to Configuration 16, wherein the fourth intermediate layer contacts the first shield.

Configuration 18

The magnetic head according to any one of Configurations 1 to 17, wherein
a stacked body including the first magnetic layer, the second magnetic layer, and the third magnetic layer has a first electrical resistance when a first current having a first orientation is caused to flow in the stacked body, the first orientation being from the first magnetic layer toward the third magnetic layer,
the stacked body has a second electrical resistance when a second current having the first orientation is caused to flow in the stacked body, the second current being larger than the first current,
the stacked body has a third electrical resistance when a third current having the first orientation is caused to flow in the stacked body, the third current being larger than the second current, and
the second electrical resistance is higher than the first electrical resistance and higher than the third electrical resistance.

Configuration 19

The magnetic head according to any one of Configurations to 17, wherein an alternating-current magnetic field is generated from a stacked body including the first magnetic layer, the second magnetic layer, and the third magnetic layer when a recording magnetic field is generated from the magnetic pole and a current flows from the magnetic pole toward the first shield.

Configuration 20

A magnetic recording device, comprising:
the magnetic head according to any one of Configurations 1 to 19; and a magnetic recording medium, information being recorded in the magnetic recording medium by the magnetic head.

According to the embodiments, a magnetic head and a magnetic recording device can be provided in which the recording density can be increased.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, first shields, second shields, stacked bodies, magnetic layers, intermediate layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head, comprising:
   a magnetic pole;
   a first shield;
   a first magnetic layer provided between the magnetic pole and the first shield;
   a second magnetic layer provided between the first magnetic layer and the first shield;
   a third magnetic layer provided between the second magnetic layer and the first shield;
   a first intermediate layer provided between the magnetic pole and the first magnetic layer, the first intermediate layer including at least one material selected from a first group consisting of Au, Cu, Ag, Al, and Ti;
   a second intermediate layer provided between the first magnetic layer and the second magnetic layer, the second intermediate layer including at least one material selected from a second group consisting of Ta, Ir, W, Mo, Cr, Tb, Rh, and Pd;
   a third intermediate layer including at least one material selected from the first group and being provided between the second magnetic layer and the third magnetic layer; and
   a fourth intermediate layer including at least one material selected from the second group and being provided between the third magnetic layer and the first shield,
   wherein:
   the first magnetic layer has a first saturation magnetic flux density and a first thickness, the first thickness being along a first direction, the first direction being from the magnetic pole toward the first shield,
   the second magnetic layer has a second saturation magnetic flux density and a second thickness, the second thickness being along the first direction,
   a first product of the first saturation magnetic flux density and the first thickness is smaller than a second product of the second saturation magnetic flux density and the second thickness,
   the third magnetic layer has a third saturation magnetic flux density and a third thickness, the third thickness being along the first direction, and
   the first product is larger than a third product of the third saturation magnetic flux density and the third thickness.

2. The magnetic head according to claim 1, wherein a first thickness of the first magnetic layer along a first direction is not less than 2.5 nm and not more than 8 nm, the first direction being from the magnetic pole toward the first shield.

3. The magnetic head according to claim 2, wherein a second thickness of the second magnetic layer along the first direction is greater than 5 nm and not more than 15 nm.

4. The magnetic head according to claim 2, wherein a third thickness of the third magnetic layer along the first direction is not less than 1 nm but less than 5 nm.

5. The magnetic head according to claim 2, wherein a thickness of the first intermediate layer along the first direction is not less than 1 nm and not more than 4 nm.

6. The magnetic head according to claim 2, wherein a thickness of the second intermediate layer along the first direction is not less than 1 nm and not more than 5 nm.

7. The magnetic head according to claim 2, wherein a thickness of the third intermediate layer along the first direction is not less than 1 nm and not more than 5 nm.

8. The magnetic head according to claim 2, wherein a thickness of the fourth intermediate layer along the first direction is not less than 1 nm and not more than 10 nm.

9. The magnetic head according to claim 2, wherein a length along the first direction of a stacked body is 25 nm or less, the stacked body including the first magnetic layer, the second intermediate layer, the second magnetic layer, the third intermediate layer, and the third magnetic layer.

10. The magnetic head according to claim 1, wherein a current density of a current flowing in a stacked body is $2\times10^8$ cm$^2$ or more, the stacked body including the first magnetic layer, the second intermediate layer, the second magnetic layer, the third intermediate layer, and the third magnetic layer.

11. The magnetic head according to claim 1, wherein
   the first intermediate layer contacts the first magnetic layer,
   the second intermediate layer contacts the first magnetic layer and the second magnetic layer, the third intermediate layer contacts the second magnetic layer and the third magnetic layer, and the fourth intermediate layer contacts the third magnetic layer.

12. The magnetic head according to claim 1, wherein a stacked body including the first magnetic layer, the second magnetic layer, and the third magnetic layer has a first electrical resistance when a first current having a first orientation is caused to flow in the stacked body, the first orientation being from the first magnetic layer toward the third magnetic layer, the stacked body has a second electrical resistance when a second current having the first orientation is caused to flow in the stacked body, the second current being larger than the first current, the stacked body has a third electrical resistance when a third current having the first orientation is caused to flow in the stacked body, the third current being larger than the second current, and the second electrical resistance is higher than the first electrical resistance and higher than the third electrical resistance.

13. The magnetic head according to claim 1, wherein an alternating-current magnetic field is generated from a stacked body including the first magnetic layer, the second magnetic layer, and the third magnetic layer when a recording magnetic field is generated from the magnetic pole and a current flows from the magnetic pole toward the first shield.

14. A magnetic recording device, comprising:
the magnetic head according to claim 1; and
a magnetic recording medium, information being recorded in the magnetic recording medium by the magnetic head.

15. A magnetic head, comprising:
a magnetic pole;
a first shield;
a first magnetic layer provided between the magnetic pole and the first shield;
a second magnetic layer provided between the first magnetic layer and the first shield;
a third magnetic layer provided between the second magnetic layer and the first shield;
a first intermediate layer provided between the magnetic pole and the first magnetic layer, the first intermediate layer including at least one material selected from a first group consisting of Au, Cu, Ag, Al, and Ti;
a second intermediate layer provided between the first magnetic layer and the second magnetic layer, the second intermediate layer including at least one material selected from a second group consisting of Ta, Ir, W, Mo, Cr, Tb, Rh, and Pd;
a third intermediate layer including at least one material selected from the first group and being provided between the second magnetic layer and the third magnetic layer; and
a fourth intermediate layer including at least one material selected from the second group and being provided between the third magnetic layer and the first shield,
wherein:
a first thickness of the first magnetic layer along a first direction is thinner than a second thickness of the second magnetic layer along the first direction, the first direction being from the magnetic pole toward the first shield, and
the first thickness is thicker than a third thickness of the third magnetic layer along the first direction.

16. A magnetic head, comprising:
a magnetic pole;
a first shield;
a first magnetic layer provided between the magnetic pole and the first shield;
a second magnetic layer provided between the first magnetic layer and the first shield;
a third magnetic layer provided between the second magnetic layer and the first shield;
a first intermediate layer provided between the magnetic pole and the first magnetic layer, the first intermediate layer including at least one material selected from a first group consisting of Au, Cu, Ag, Al, and Ti;
a second intermediate layer provided between the first magnetic layer and the second magnetic layer, the second intermediate layer including at least one material selected from a second group consisting of Ta, Ir, W, Mo, Cr, Tb, Rh, and Pd;
a third intermediate layer including at least one material selected from the first group and being provided between the second magnetic layer and the third magnetic layer; and
a fourth intermediate layer including at least one material selected from the second group and being provided between the third magnetic layer and the first shield,
wherein:
the first intermediate layer contacts the first magnetic layer,
the second intermediate layer contacts the first magnetic layer and the second magnetic layer,
the third intermediate layer contacts the second magnetic layer and the third magnetic layer,
the fourth intermediate layer contacts the third magnetic layer, and
the first intermediate layer contacts the magnetic pole.

17. The magnetic head according to claim 16, wherein the fourth intermediate layer contacts the first shield.

* * * * *